(12) United States Patent
Jing

(10) Patent No.: US 9,884,337 B2
(45) Date of Patent: Feb. 6, 2018

(54) COATING DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Yangkun Jing, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 245 days.

(21) Appl. No.: 14/813,674

(22) Filed: Jul. 30, 2015

(65) Prior Publication Data
US 2016/0184853 A1    Jun. 30, 2016

(30) Foreign Application Priority Data

Dec. 30, 2014  (CN) .......................... 2014 1 0850542

(51) Int. Cl.
*B05C 11/10* (2006.01)
*B05B 12/12* (2006.01)
(Continued)

(52) U.S. Cl.
CPC .......... *B05B 12/124* (2013.01); *B05B 15/001* (2013.01); *B05C 11/1018* (2013.01); *G02F 2001/13415* (2013.01)

(58) Field of Classification Search
None
See application file for complete search history.

(56) References Cited

U.S. PATENT DOCUMENTS 4,825,091 A * 4/1989 Breyer ............... G01B 11/0608
250/559.38
6,129,040 A * 10/2000 Viggiano ............ H01L 21/6715
118/323
(Continued)

FOREIGN PATENT DOCUMENTS

CN        1508594 A     6/2004
CN        1577739 A     2/2005
(Continued)

OTHER PUBLICATIONS

First Chinese Office Action Appln. No. 201410850542.8; dated Mar. 31, 2016.

*Primary Examiner* — Charles Capozzi
(74) *Attorney, Agent, or Firm* — Ladas & Parry LLP

(57) ABSTRACT

A coating device comprises a base, a mounting bracket mounted to the base by a driving mechanism, a coating unit which comprises a supporting rack mounted to the mounting bracket and a nozzle mounted to the supporting rack, and the coating device further comprises a detecting device mounted to the supporting rack, which detects information about a distance between the nozzle and a surface of the substrate to be coated and information about an obstacle on a substrate in an advancing direction of the nozzle; a control unit, which controls to keep the distance to be a preset distance based on the detected distance information, and which controls to stop operation of the nozzle where an obstacle is detected on a region on the surface of the substrate between the detecting device and the nozzle.

17 Claims, 3 Drawing Sheets

(51) Int. Cl.
*B05B 15/00* (2006.01)
*G02F 1/1341* (2006.01)

(56) References Cited

U.S. PATENT DOCUMENTS

| | | | |
|---|---|---|---|
| 2002/0113198 A1* | 8/2002 | Bieman | B05C 5/0216 250/221 |
| 2004/0131758 A1 | 7/2004 | Jung et al. | |
| 2006/0045972 A1* | 3/2006 | Kwon | B05C 5/0254 427/256 |
| 2007/0175175 A1* | 8/2007 | Schwenke | H05B 3/86 52/745.19 |

FOREIGN PATENT DOCUMENTS

| | | |
|---|---|---|
| CN | 102019244 A | 4/2011 |
| CN | 102078846 A | 6/2011 |
| CN | 203281461 A | 11/2013 |
| JP | 2012-124380 A | 6/2012 |

\* cited by examiner

COATING DEVICE

TECHNICAL FIELD

Embodiments of the present disclosure relate to a coating device.

BACKGROUND

In recent years, a typical frontier technology used in LCD manufacture industry is ODF (One Drop Fill). The ODF process specifically comprises dropping liquid crystals on one substrate (TFT or CF), uniformly coating sealing agent on another substrate associated therewith, and performing alignment with high precision to form a liquid crystal cell after coating and dropping processes has been carried out.

In current ODF coating process, distance between a coating nozzle and the glass substrate is very small and is only about 10 micron. Therefore, once foreign matter exists on a surface of the glass substrate or in a moving direction of the coating nozzle, the coating nozzle is inclined to be damaged by collision or to be blocked, as a result of which a break off of seal agent and a leakage of liquid crystal will occur and thus the coating nozzle has to be replaced, which in turn causes an increase of cost.

SUMMARY

A coating device comprises a base, a mounting bracket mounted to the base by a driving mechanism, and a coating unit which comprises a supporting rack mounted to the mounting bracket and a nozzle mounted to the supporting rack, wherein the coating device further comprises a detecting device mounted to the supporting rack, which detects a distance between the nozzle and a substrate surface to be coated and detects whether there is an obstacle in an advancing direction of the nozzle;

a control unit connected with the detecting device, which controls to keep the distance between the nozzle and the substrate surface to be a preset distance by means of the driving mechanism, and which controls to stop operation of the nozzle by means of the driving mechanism where the detecting device detects that there is an obstacle in a region of the substrate in the advancing direction of the nozzle.

In the above coating device, the detecting device can detect a distance between the nozzle and the surface of the substrate, and at the same time, can detect whether there is an obstacle in a region on the substrate surface at the advancing direction side of the nozzle. Based on the detected distance, the control unit can control to keep the distance between the nozzle and the substrate surface to be a set distance by means of the driving mechanism. When the detecting device detects that there is an obstacle in a region on the surface of the substrate at the advancing direction side of the nozzle, the control unit can control to stop the operation of the nozzle by means of the driving mechanism. Thus, it can be ensured that the nozzle is always kept at a preset distance from the substrate surface during the coating process. Since the operation of the nozzle is stopped when detecting that there is an obstacle on the surface of the substrate in the advancing direction of the nozzle, it can be ensured that the nozzle does not collide with a boss or an obstacle on the substrate surface. Therefore, the coating device can prevent the nozzle from being damaged or blocked during the coating process.

In one embodiment according to the present disclosure, the detecting device comprises an infrared reflective sensor which comprises an infrared transmitting component and an infrared receiving component, and an imaging device which being connected to the infrared reflective sensor and the control unit respectively, and processing signals received by the infrared sensor so as to determine the distance between the nozzle and the substrate surface to be coated and determine whether there is an obstacle in a region of the substrate in the advancing direction side of the nozzle.

In one embodiment according to the present disclosure, the detecting device comprises a first detecting unit for detecting the distance between the nozzle and the substrate surface to be coated and a second detecting unit for detecting whether there is an obstacle on the surface of the substrate in the advancing direction side of the nozzle.

In one embodiment according to the present disclosure, the first detecting unit is an ultrasonic detecting device.

In one embodiment according to the present disclosure, the second detecting unit is a laser detecting device.

In one embodiment according to the present disclosure, the laser detecting device comprises at least one laser emitter for emitting a detecting laser light to the advancing direction of the nozzle, and at least one laser receiver for receiving a laser light which is emitted from the laser emitter and is reflected by an obstacle.

In one embodiment according to the present disclosure, the coating unit further comprises a protection mechanism which is mounted to the supporting rack and is located at the advancing direction side of the nozzle.

In one embodiment according to the present disclosure, the protection mechanism comprises at least one baffle extending in a direction which is parallel to a direction of a slit of the nozzle.

In one embodiment according to the present disclosure, the protection mechanism comprises a first baffle and a second baffle, the second baffle is positioned between the first baffle and the nozzle, and the first baffle and the second baffle cooperate to form a foreign matter receiving trough therebetween.

In one embodiment according to the present disclosure, a lateral side of the second baffle far away from the nozzle forms an angle in a range of 60 to 120 degree with respect to the substrate surface to be coated.

In one embodiment according to the present disclosure, the protection mechanism comprises a plurality of baffles, and every two adjacent baffles cooperate to form a foreign matter receiving trough.

In one embodiment according to the present disclosure, a vacuum conduit connected with a vacuum device is provided at bottom of the foreign matter receiving trough.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
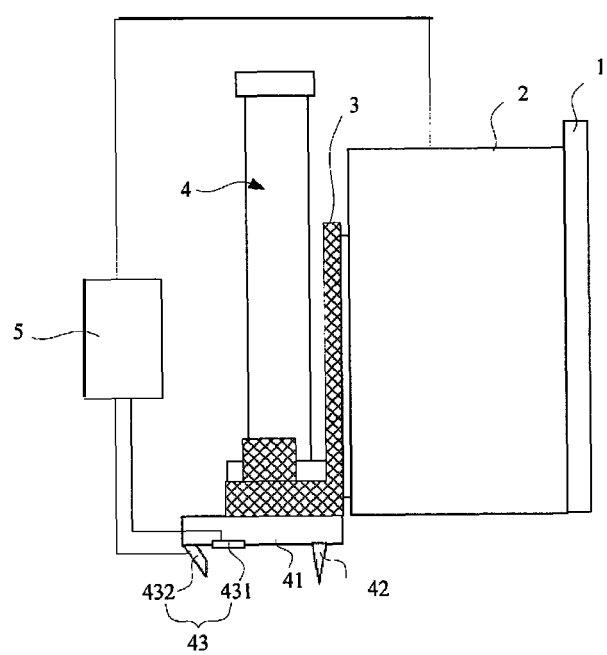
FIG. 1 is a schematic structural view of a coating device according to an embodiment of the present disclosure.

Please refer to FIG. 1, which is a schematic structural view of a coating device according to an embodiment of the present disclosure.

As illustrated in FIG. 1, the coating device according to an embodiment of the present disclosure comprises a base 1, a mounting bracket 3 mounted to the base 1 by a driving mechanism 2, and a coating unit 4 which comprises a supporting rack 41 mounted to the mounting bracket 3 and a nozzle 42 mounted to the supporting rack 41. The coating device further comprises a detecting device 43 mounted to the supporting rack 41, which detects a distance between the nozzle 42 and a surface of a substrate to be coated and detects whether there is an obstacle on a surface of the substrate in an advancing direction of the nozzle 42;

a control unit 5 connected with the detecting device 43, which controls to keep the distance between the nozzle 42 and the substrate surface to be a preset distance, and which controls to stop operation of the nozzle 42 by the driving mechanism 2 where the detecting device 43 detects that there is an obstacle in a region on a substrate surface between the detecting device 43 and the nozzle 42.

In the above coating device, the detecting device 43 can detect the distance between the nozzle 42 and the substrate surface, while detecting whether there is an obstacle in a region of the surface of the substrate at the advancing direction side of the nozzle 42. Based on the detected distance, the control unit 5 can control to keep the distance between the nozzle 42 and the substrate surface to be a preset distance by means of the driving mechanism 2. When the detecting device 43 detects that there is an obstacle in a region on the surface of the substrate at the advancing direction side of the nozzle 42, the control unit 5 can control to stop operation of the nozzle 42 by means of the driving mechanism 2. Thus, it can be ensured that the nozzle 42 is always kept a preset distance from the surface of the substrate during the coating process. Since the operation of the nozzle 42 is stopped where there is an obstacle on the surface of the substrate in the advancing direction of the nozzle 42, it can be ensured that the nozzle 42 will not collide with the substrate or any obstacle on the surface of the substrate. The above coating device can prevent the nozzle 42 from being damaged or blocked during the coating process.

In one embodiment according to the present disclosure, the detecting device 43 comprises an infrared reflective sensor which comprises an infrared transmitting component and an infrared receiving component, and an imaging device which is connected to the infrared reflective sensor and the control unit 5 respectively. The imaging device performs imaging processing on infrared signals received by the infrared reflective sensor so as to detect the distance between the nozzle 42 and the surface of the substrate to be coated and to detect whether there is an obstacle on the surface of the substrate at the advancing direction side of the nozzle 42. And then, the control unit 5 controls the operation of the nozzle 42 by means of the driving mechanism 2 according to information on the detected distance and whether there is an obstacle or not.

Based on the information obtained by the detecting device, the control unit 5 can control the movement of the nozzle 42 by means of the driving mechanism 2. The control unit 5 can control the supporting rack 41 to move up and down with respect to the mounting bracket 3 by use of the driving mechanism 2 based on the detected distance between the nozzle 42 and the surface of the substrate to be coated, so that a preset distance is kept between the nozzle 42 mounted on the supporting rack 41 and the substrate, and thereby preventing the nozzle 42 from colliding with an obstacle or a boss on the substrate. At the same time, the control unit 5 can control the nozzle 42 to stop advancing forward and to stop coating operation by the driving mechanism 2, based on the obtained information on the existence of an obstacle on the substrate at the advancing direction side of the nozzle 42, and thereby being capable of preventing the nozzle 42 from colliding with the obstacle on the substrate and improving safety of the nozzle 42 during its operation.

In another embodiment according to the present disclosure, the detecting device 43 can comprise a first detecting unit and a second detecting unit. The first detecting unit detects the distance between the nozzle 42 and the surface of the substrate to be coated. The second detecting unit detects whether there is an obstacle on the substrate at the advancing direction side of the nozzle 42.

Figure 2:
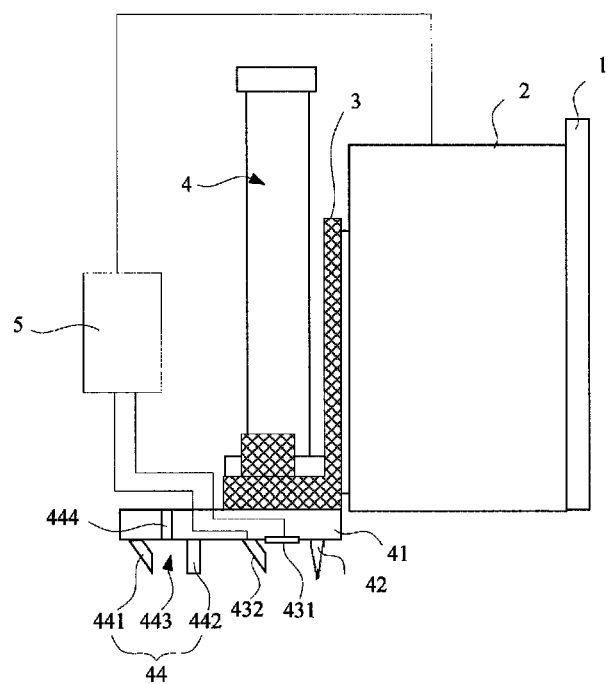
FIG. 2 is a schematic structural view of another coating device according to an embodiment of the present disclosure.

For example, the first detecting unit can be an ultrasonic detecting device 431. As illustrated in FIG. 1 and FIG. 2, the ultrasonic detecting device 431 can detect a time period from a time point when an ultrasonic wave is transmitted to a time point when an echo is received so as to determine the distance between the nozzle 42 and the surface of the substrate. And further, whether there is a boss or an obstacle on the substrate surface can be determined by analyzing the obtained distance.

The second detecting unit can be a laser detecting device 432. As illustrated in FIG. 1 and FIG. 2, the laser detecting device 432 can comprise at least one laser emitter for emitting a detecting laser light to a direction of the nozzle 42, and at least one reflective laser receiver for receiving a laser light which is irradiated on an obstacle by the laser emitter and then is reflected by the obstacle if the obstacle exists between the laser emitter and the nozzle 42. If the reflective laser receiver receives a reflected laser light, it is indicated that there is an obstacle in a region on the surface of the substrate between the laser detecting device 432 and the nozzle 42. Information of the obstacle on the substrate surface can be directly detected by the laser detecting device 432.

In one embodiment according to the present disclosure, the second detecting unit can be a laser detecting device 432. The laser detecting device comprises at least one laser emitter for emitting a detecting laser light to the direction of the nozzle 42, and at least one laser receiver located at a position close to the lower end of the nozzle 42. When the laser receiver receives the laser light emitted from the laser emitter, it is indicated that there is no obstacle on the substrate surface in a region between the laser detecting device 432 and the nozzle 42. When the laser receiver does not receive the laser light emitted from the laser emitter, it is indicated that there is an obstacle on the substrate surface in a region between the laser detecting device 432 and the nozzle 42.

In one embodiment according to the present disclosure, the laser detecting device 432 can be an infrared laser detector.

Figure 3:
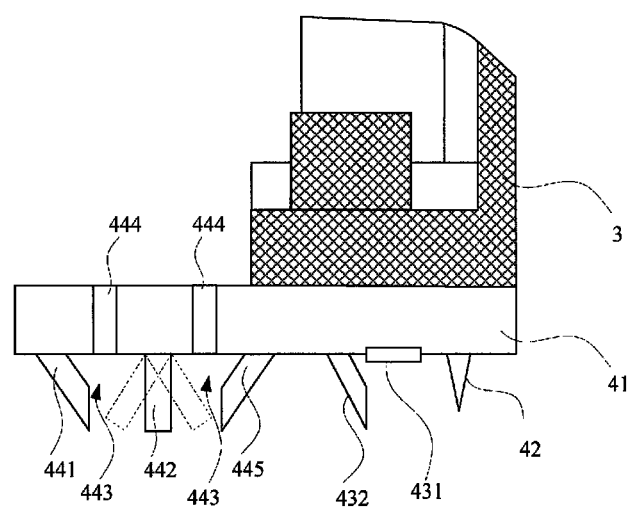
FIG. 3 is a schematic structural view of still another coating device according to an embodiment of the present disclosure.

As illustrated in FIG. 2 and FIG. 3, on the basis of the above embodiments, in a modified embodiment, the coating unit 4 can further comprise a protection mechanism 44 which is mounted to the supporting rack 41 and is located at the advancing direction side of the nozzle 42.

As illustrated in FIG. 2 and FIG. 3, on the basis of the above embodiments, in a modified embodiment, the protection mechanism 44 comprises at least one baffle extending in a direction which is parallel to an extending direction of a slit of the nozzle 42. The baffle is positioned in front of the nozzle in the advancing direction of the nozzle 42. A lower end of the baffle flushes with the lower end of the nozzle 42.

On the basis of the above embodiments, in a modified embodiment, as illustrated in FIG. 2 and FIG. 3, the protection mechanism 44 comprises a first baffle 441 and a second baffle 442. The first baffle 441 and the second baffle 442 are both positioned in front of the nozzle in the advancing direction of the nozzle. The second baffle 442 is positioned between the first baffle 441 and the nozzle 42. The first baffle 441 and the second baffle 442 cooperate to form a foreign matter receiving trough 443 therebetween.

The distances between the lower ends of the first baffle 441 and the second baffle 442 to the substrate are equal to or smaller than the distance between the nozzle 42 and the substrate. When there is an obstacle having a size greater than the distance between the nozzle 42 and the substrate in the advancing direction of the nozzle 42, the obstacle will be contacted with the first baffle 441 at first and can be pushed away by the first baffle 441 so as to prevent the obstacle from contacting the nozzle 42. If the obstacle collides with the first baffle 441 and is broken into pieces, and a part of its fragments enters into a space between the first baffle 441 and the second baffle 442, the second baffle 442 can further block obstacle fragments having a great size and capture them within the foreign matter receiving trough 443 formed by cooperation of the first baffle 441 and the second baffle 442.

In one embodiment according to the present disclosure, a vacuum conduit 444 connected with a vacuum device is provided at bottom of the foreign matter receiving trough 443. Since the bottom of the foreign matter receiving trough 443 is provided with the vacuum conduit 444 connected with a vacuum device, air pressure within the foreign matter receiving trough 443 can be made lower and thus smaller obstacle fragments in the foreign matter receiving trough 443 can be directly sucked away while larger obstacle fragments can be kept in the foreign matter receiving trough 443, so that obstacle fragments are prevented from contacting the nozzle 42 and the nozzle 42 can be protected from a risk of being collided.

In one embodiment of the present disclosure, as indicated by the dotted line in FIG. 3, a lateral side of the second baffle 442 far away from the nozzle 42 forms an angle in a range of 60 to 120 degree with respect to the surface of the substrate to be coated.

As illustrated in FIG. 3, in one embodiment of the present disclosure, the protection mechanism 44 can comprise a plurality of baffles. Every two adjacent baffles can cooperate to form a foreign matter receiving trough therebetween. As illustrated in FIG. 3, the protection mechanism 44 comprises a first baffle 441, a second baffle 442 and a third baffle 445. A foreign matter receiving trough 443 for receiving obstacles is formed between the first baffle 441 and the second baffle 442 as well as between the second baffle 442 and the third baffle 445. The plurality of baffles collectively blocking obstacles can further ensure that the obstacles are completely captured within the foreign matter receiving troughs 443 and will not contact the nozzle 42 and therefore the nozzle 42 will not be damaged or blocked.

Of course, a vacuum conduit 444 connected with a vacuum device is provided at bottom of each foreign matter receiving trough 443 so that the obstacles is sucked into the foreign matter receiving trough 443.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201410850542.8 filed on Dec. 30, 2014, the disclosure of which is hereby entirely incorporated by reference.

The invention claimed is:

1. A coating device, comprising a base, a mounting bracket mounted to the base, a coating unit which comprises a supporting rack mounted to the mounting bracket and a nozzle mounted to the supporting rack, the coating device further comprising
   a detecting device mounted to the supporting rack, which detects information on a distance between the nozzle and a surface of a substrate to be coated and on an obstacle on a substrate in an advancing direction of the nozzle;
   a control unit connected with the detecting device, configured to keep the distance between the nozzle and the substrate surface to be a preset distance by means of a driving mechanism based on the distance information obtained by the detecting device, and to stop operation of the nozzle by the driving mechanism where the detecting device detects that there is an obstacle in a region on the surface of the substrate between the detecting device and the nozzle;
   wherein the coating unit further comprises a protection mechanism which is mounted to the supporting rack and is located at the advancing direction side of the nozzle, the protection mechanism comprises a first baffle and a second baffle, the second baffle is positioned between the first baffle and the nozzle, and the first baffle and the second baffle cooperate to form a foreign matter receiving trough therebetween.

2. The coating device according to claim 1, wherein the detecting device comprises an infrared reflective sensor which comprises an infrared transmitting component and an infrared receiving component, and an imaging device which is connected to the infrared reflective sensor and the control unit respectively, and performs processing on signals received by the infrared receiving component so as to obtain the distance between the nozzle and the surface of the substrate to be coated and/or determine whether there is an obstacle on the substrate in the advancing direction of the nozzle.

3. The coating device according to claim 1, wherein the detecting device comprises a first detecting unit for detecting the distance between the nozzle and the surface of the substrate to be coated and a second detecting unit for detecting whether there is an obstacle on the substrate in the advancing direction of the nozzle.

4. The coating device according to claim 3, wherein the first detecting unit is an ultrasonic detecting device.

5. The coating device according to claim 3, wherein the second detecting unit is a laser detecting device.

6. The coating device according to claim 5, wherein the laser detecting device comprises
at least one laser emitter for emitting a detecting laser light to a direction of the nozzle, and
at least one laser receiver for receiving a laser light which is reflected from an obstacle if the obstacle exists between the at least one laser emitter and the nozzle.

7. The coating device according to claim 6, wherein the at least one laser emitter and the at least one laser receiver are both mounted at a position close to a lower end of at least one of the first baffle and the second baffle at a side facing to the nozzle.

8. The coating device according to claim 5, wherein the laser detecting device comprises
at least one laser emitter for emitting a detecting laser light to a direction of the nozzle, and
at least one laser receiver for receiving the laser light emitted from the at least one laser emitter where there is no obstacle between the laser emitter and the nozzle.

9. The coating device according to claim 8, wherein the at least one laser emitter is mounted at a lower portion close to a lower end of at least one of the first baffle and the second baffle at a side facing to the nozzle, and the at least one laser receiver is mounted at a position close to a lower end of the nozzle.

10. The coating device according to claim 1, wherein at least one of the first baffle and the second baffle extend in a direction which is parallel to a direction of a slit of the nozzle.

11. The coating device according to claim 1, wherein each of distances from lower ends of the first baffle and the second baffle to the substrate is less than or equal to the distance between the nozzle and the substrate.

12. The coating device according to claim 1, wherein a lateral side of the second baffle far away from the nozzle forms an angle in a range of 60 to 120 degree with respect to the surface of the substrate to be coated.

13. The coating device according to claim 12, wherein the protection mechanism comprises a plurality of baffles, and every two adjacent baffles cooperate to form a foreign matter receiving trough therebetween.

14. The coating device according to claim 1, wherein a vacuum conduit connected with a vacuum device is provided at bottom of the foreign matter receiving trough.

15. The coating device according to claim 11, wherein a vacuum conduit connected with a vacuum device is provided at bottom of the foreign matter receiving trough.

16. The coating device according to claim 12, wherein a vacuum conduit connected with a vacuum device is provided at bottom of the foreign matter receiving trough.

17. The coating device according to claim 13, wherein a vacuum conduit connected with a vacuum device is provided at bottom of the foreign matter receiving trough.

* * * * *